Patented May 1, 1928.

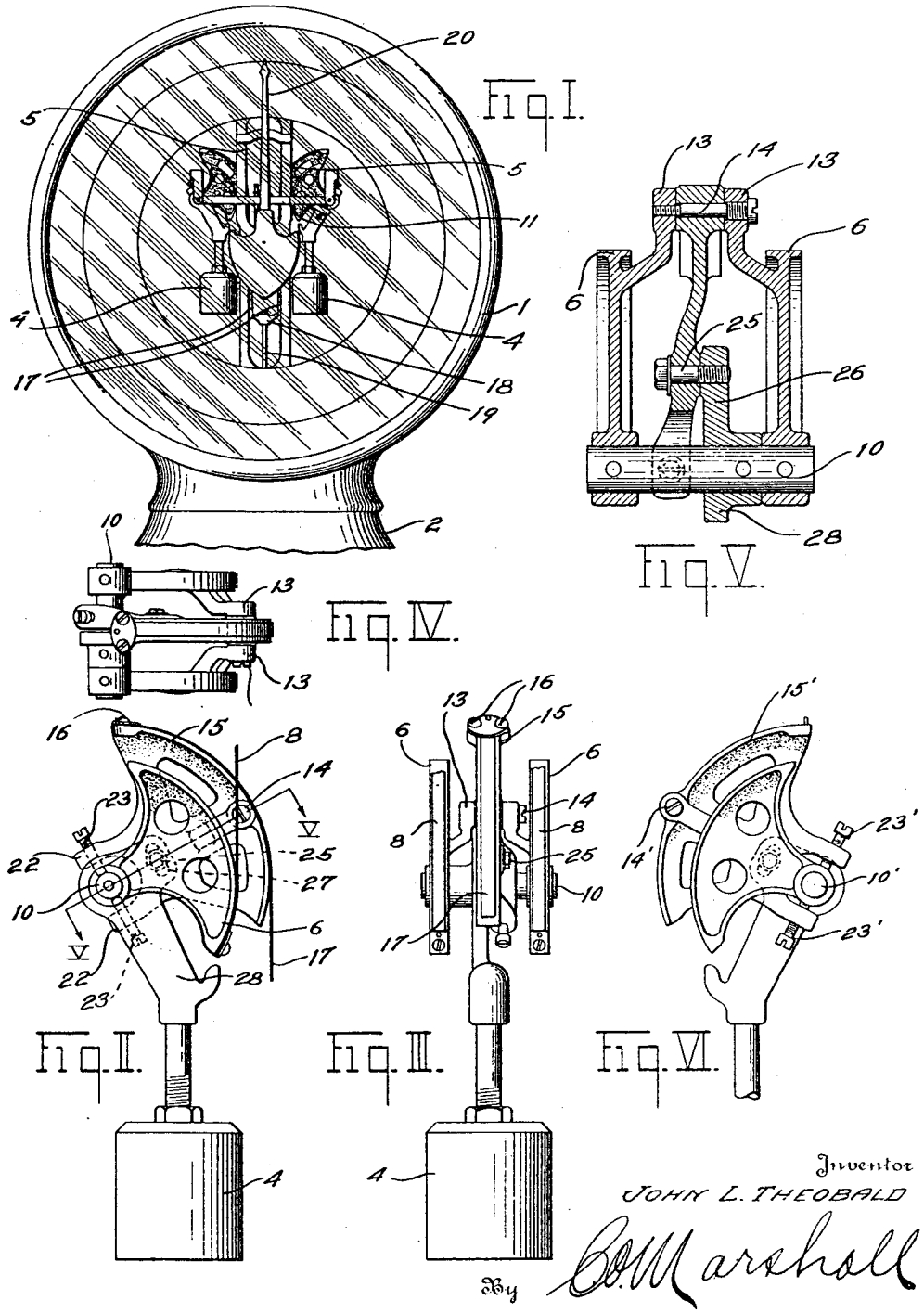

1,667,909

UNITED STATES PATENT OFFICE.

JOHN L. THEOBALD, OF PHILADELPHIA, PENNSYLVANIA, ASSIGNOR TO TOLEDO SCALE COMPANY, OF TOLEDO, OHIO, A CORPORATION OF NEW JERSEY.

WEIGHING SCALE.

Application filed February 4, 1925. Serial No. 6,855.

This invention relates to weighing scales of the so-called pendulum type, and particularly to a weighing scale pendulum having an eccentric power sector so arranged that the high point of the power sector may be angularly adjusted.

In the usual form of load-counterbalancing pendulum such as is shown in the patent to Hapgood No. 1,203,611, issued November 7, 1916, a flexible metallic band or ribbon overlies the curved surface of the power sector and is secured thereto, the power sector being adjustably fixed to the shaft upon which the fulcrum sector is mounted. The purpose of an angular adjustment of the power sector is to shift its relative position so that the flexible band will pull off of certain portions of its curved face during weighing movements. In the forms of pendulums that have heretofore been used in weighing scales having the power sector mounted on the same shaft with the fulcrum sectors, the adjustment is made by angularly shifting the power sector about this shaft as an axis.

It is a usual practice in scale manufacturing to so construct a scale that through the employment of lever mechanisms of various multiplications scales of different capacities may be devised without material change in the load-counterbalancing mechanism. Such changes in the lever mechanism always require a different adjustment of the center of mass of the pendulum. If the center of mass of the pendulum be moved outwardly the pendulum will, when released, swing to bring the center of mass approximately to its original position, and the power and fulcrum sectors will swing up so that a different part of the fulcrum sector will be utilized during weighing operations. The indicator in this type of weighing scale is moved whenever the fulcrum sector changes its relative position, and adjustment of the pendulum causes the indicator to be moved from its original zero position.

One of the principal objects of my invention is the provision of a power sector for pendulum scales which is capable of broad scope of adjustment.

Another object of my invention is the provision of means for adjusting a pendulum power sector, which adjustment may be made without materially affecting the zero balance of the scale.

Another object of the invention is the provision of means for adjusting the angular position of the power sector without changing the relative positions of the pendulum and fulcrum sector.

Still another object of the invention is the provision of an improved means for adjusting a pendulum power sector which may be easily manipulated without the use of special tools and when once adjusted is not liable to get out of adjustment.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view of a portion of a weighing scale showing my invention in connection therewith;

Figure II is an enlarged front elevational view of one of the load-counterbalancing elements of my invention;

Figure III is a side view of the element illustrated in Figure II;

Figure IV is a top plan view of the load-counterbalancing element;

Figure V is a slightly enlarged sectional view taken substantially on the line V—V of Figure II;

Figure VI is a fragmentary elevational view of a modified form of a load-counterbalancing element.

Referring to the drawings in detail, I have shown my invention as applied to a scale of the type having the load-counterbalancing mechanism enclosed and supported within a watch-case-shaped housing 1 and adapted to rest upon a suitable column 2, the major portion of which is not shown, or other suitable support arranged in juxtaposition to the platform and platform lever mechanism (not shown). It is to be understood that any suitable platform and platform lever mechanism may be employed, the weighing mechanism herein shown being designed to operate satisfactorily when employed in various forms of scales.

The load-counterbalancing mechanism of the scale is supported upon a vertically disposed frame 3 fixed within the housing 1, and comprises a pair of oppositely disposed pendulums 4 provided with fulcrum sectors 6 which are suspended from the frame 3 by means of flexible metallic ribbons 8 secured to the sectors, as shown in Figure II. The fulcrum sectors 6 are fixed upon transversely extending shafts 10, the shafts being connected together by crossbars 11, substantially as illustrated in Figure I, said shafts 10 and crossbars 11 forming a rectangular frame which is adapted to operate the indicating mechanism through rack and pinion mechanism (not shown).

Each pair of fulcrum sectors 6 is provided with projecting lugs 13 having threaded apertures therein adapted to receive a stud screw 14. Pivotally mounted upon the stud 14 is a sector 15 having an arcuate surface of somewhat greater radius than that of the fulcrum sectors. The sector 15 will be hereinafter referred to as the power sector. This sector 15 is so positioned with respect to the supporting frame 3 as to extend between the pillars 5 of the frame. Fixed to the upper portion of the power sector by means of screws 16 is a flexible ribbon 17 adapted to overlie the curved exterior surface of said sector, the lower end thereof being connected to a yoke 18. A rod 19 connects the yoke 18 to the platform lever mechanism (not shown), and when a load is placed upon the scale the rod 19 and ribbons 17 are pulled downwardly, thus swinging the pendulums outwardly and causing the fulcrum sectors 6 to roll upwardly on the ribbons 8. As the fulcrum sectors 6 roll upwardly on the ribbons 8 the compensating crossbars 11 are moved upwardly, and through the medium of rack and pinion mechanism (not shown) actuate the indicating hand 20 to swing to proper indicating position.

If the curved faces of the fulcrum sectors 6 and the power sectors 15 were concentric, the indicator hand 20 would not swing through equal arcs for equal increments of load, and it would, therefore, be necessary to space the graduations on the chart unequally. It has been found, however, that if the curved faces of the fulcrum and power sectors of a pendulum be eccentrically arranged in proper relation to each other and to the position of the center of mass of the pendulums, the fulcrum sectors will roll upwardly on the ribbons 8 equal distances for equal increments of load, even though the curved faces of the fulcrum and power sectors be curved along the arcs of true circles.

In order to provide for adjustment of the "high" point of the power sector and the center of mass of the pendulum, I have so constructed the power sector 15 that it may be slightly rotated about the stud screw 14 as a pivotal axis. To insure a positively acting adjustment of the power sector, I have provided the said sectors with a pair of lugs 22 adapted to straddle the shaft 10, the lugs having threaded apertures to receive screws 23, the extremities of which engage the shaft 10. It will be apparent that by skillful manipulation of the screws 23 the power sector may be shifted to the desired position. By means of this method of adjustment it is possible to change the relative position of the "high" point on the power sector by varying the degree of eccentricity between the power and fulcrum sectors. In this manner a comparatively broad adjustment of the power sector may be made without materially changing the effective length of the connection between the yoke 18 and the point of connection of the ribbon 17 to the power sector.

It will also be obvious that this method of mounting and adjusting the power sector will permit of sufficient adjustment to enable this type of pendulum to be used in various modifications of scales of the type herein described having varying capacities, those embodying different systems of lever mechanisms, and other various mechanisms of a kind with which the use of the ordinary type of pendulum is not adapted because of the inadequacy of adjustments to take care of these situations in scale construction.

It has been found that after the major adjustment of the screws 23 has been made to adapt the pendulum to a particular type of scale, a minor adjustment of the power sector 15 does not appreciably change the relative position of the ribbon 17. If the scale is balanced at zero and a minor adjustment of the power sector is subsequently made, the center of mass of the pendulum remains in its original position, or so nearly in its original position that no new zero adjustment is necessary.

As an additional insurance that the power sector 15 will remain in its position of adjustment, a headed locking screw 25 is passed through an elongated opening 27 in the power sector and threaded into a projection 26 forming an integral part of the pendulum body 28. By turning up this screw the power sector may be locked in any adjusted position.

In the modified form of my invention illustrated in Figure VI the axis of the stud screw 14' is in the plane of curvature of the surface of the power sector 15'. It will be apparent that the greater the distance between the shaft 10' and stud screw 14, the finer may be the adjustment obtained by manipulation of the screws 23'.

The embodiments of my invention herein shown and described are to be regarded as illustrative only, and it is to be understood that the invention is susceptible to variation, modification and change within the spirit and scope of the subjoined claims.

Having described my invention, I claim:

1. In a device of the class described, in in combination, a weighing scale pendulum having a weight, a fulcrum sector fixed to the pendulum, a power sector, and means whereby the two sectors are so connected that their faces are curved eccentrically with relation to each other and that the power sector is adjustable about a point out of alignment with the axis of curvature of the fulcrum sector.

2. In a device of the class described, in combination, a weighing scale pendulum having a weight, a fulcrum sector fixed to the pendulum, a power sector, means whereby the two sectors are so connected that their faces are curved eccentrically with relation to each other and that the power sector is adjustable about a point adjacent the curved face of the power sector, and means for locking the power sector in adjusted position.

3. In a device of the class described, in combination, a weighing scale pendulum having a weight, a fulcrum sector fixed to said pendulum, a power sector pivotally supported on said fulcrum sector the pivotal support of said power sector being out of the axis of curvature of said fulcrum sector, means for adjusting said power sector about its pivotal support on said fulcrum sector, and means for locking same in adjusted position.

4. In a device of the class described, in combination, a weighing scale pendulum, fulcrum sectors fixed thereto having radial projections, a power sector, means whereby the fulcrum sectors and power sector are so connected that their faces are curved eccentrically with relation to each other, the power sector being pivotally secured to said projections, means for adjusting said power sector to change the relative locations of the centers of the sectors, and means for locking said power sector in adjusted position.

5. In a device of the class described, in combination, a weighing scale pendulum, a fulcrum sector, a power sector pivotally secured to said fulcrum sector, the pivotal support of said power sector being out of the axis of curvature of said fulcrum sector, and means for varying the degree of eccentricity between the curved surfaces of said power and fulcrum sectors.

6. In a device of the class described, in combination, a weighing scale pendulum, a fulcrum sector fixed to said pendulum, a power sector pivotally secured to said fulcrum sector, the pivot of said power sector being out of the axis of curvature of said fulcrum sector, means for varying the degree of eccentricity between the curved surfaces of said power and fulcrum sectors, and means for locking said power and fulcrum sectors against further relative movement.

JOHN L. THEOBALD.